United States Patent
Tsuchie et al.

[11] Patent Number: 6,122,979
[45] Date of Patent: Sep. 26, 2000

[54] VEHICLE LOAD MEASURING APPARATUS

[75] Inventors: Masaya Tsuchie; Naoya Takahashi, both of Shizuoka, Japan

[73] Assignee: Yazaki Corporation, Tokyo, Japan

[21] Appl. No.: 09/071,899

[22] Filed: May 5, 1998

[30] Foreign Application Priority Data

May 13, 1997 [JP] Japan .................................. 9-122052

[51] Int. Cl.[7] .................................................. G01L 1/04
[52] U.S. Cl. ..................................................... 73/862.622
[58] Field of Search ...................... 73/862.622, 862.628, 73/862.381, 862.53, 862.541, 862.625, 862.627, 788

[56] References Cited

U.S. PATENT DOCUMENTS

| | | | |
|---|---|---|---|
| 4,380,175 | 4/1983 | Griffen | 73/862.622 |
| 4,657,097 | 4/1987 | Griffen | 177/211 |
| 4,979,580 | 12/1990 | Lockery | 177/211 |
| 5,369,226 | 11/1994 | Griffen et al. | 177/211 |
| 5,610,343 | 3/1997 | Eger et al. | 73/862.628 |

FOREIGN PATENT DOCUMENTS

8-313332  11/1996  Japan ............................. G01G 19/12

*Primary Examiner*—Max Noori
*Attorney, Agent, or Firm*—Sughrue, Mion, Zinn, Macpeak & Seas, PLLC

[57] ABSTRACT

When there is a difference in characteristic between sensing devices received respectively in receiving portions disposed at the opposite ends of a shackle pin and, therefore, the voltage of a load signal obtained from the sensing device in the receiving portion side is higher than the voltage of a load signal obtained from the sensing device in the receiving portion side because of the above-mentioned difference even if the loads imposed on the receiving portions respectively are equal to each other, configuration is made so that a correction resistor is parallelly connected to a detection winding of the sensing device in the receiving portion side. Accordingly, a part of the induced current flowing between opposite ends of the detection winding also flow in the correction resistor, so that a voltage drop occurs in the correction resistor. By this voltage drop, the voltage of the load signal obtained from the sensing device in the receiving portion side is made coincident with the voltage of the load signal obtained from the sensing device in the receiving portion side.

11 Claims, 6 Drawing Sheets

VEHICLE LOAD MEASURING APPARATUS

BACKGROUND OF THE INVENTION

The present invention relates to an apparatus for measuring a load at a shaft member having opposite ends on which the weight of a vehicle such as a truck is dispersively imposed.

The measurement of a load of a vehicle is performed mainly for a large-sized vehicle such as a truck, for example, for the purpose of preventing traffic accidents such as rolling accidents caused by overload, etc., and preventing acceleration of deterioration of the vehicle and a road surface. Conventionally, there is used a method in which the measurement of a load of a vehicle is performed in the condition that the vehicle, which is a subject of the measurement, is placed on a platform weighing machine commonly called "Kankan". Recently, the conventional method is shifted to a method in which the measurement of a load of a vehicle is performed by a load measuring apparatus which is mounted on the vehicle per se without necessity of such an equipment and installation space.

As the aforementioned on-vehicle type load measuring apparatuses, the present applicant has already proposed some load measuring apparatuses using load measurement sensing devices such as strain gauge sensors attached to circular-arc-like leaf springs interposed between carrier frames and axles.

As one of them, a structure for attaching vehicle load measurement sensing devices has been proposed in Japanese Patent Unexamined Publication No. Hei. 8-313332 with respect to the arrangement of the sensing devices.

Figure 6:
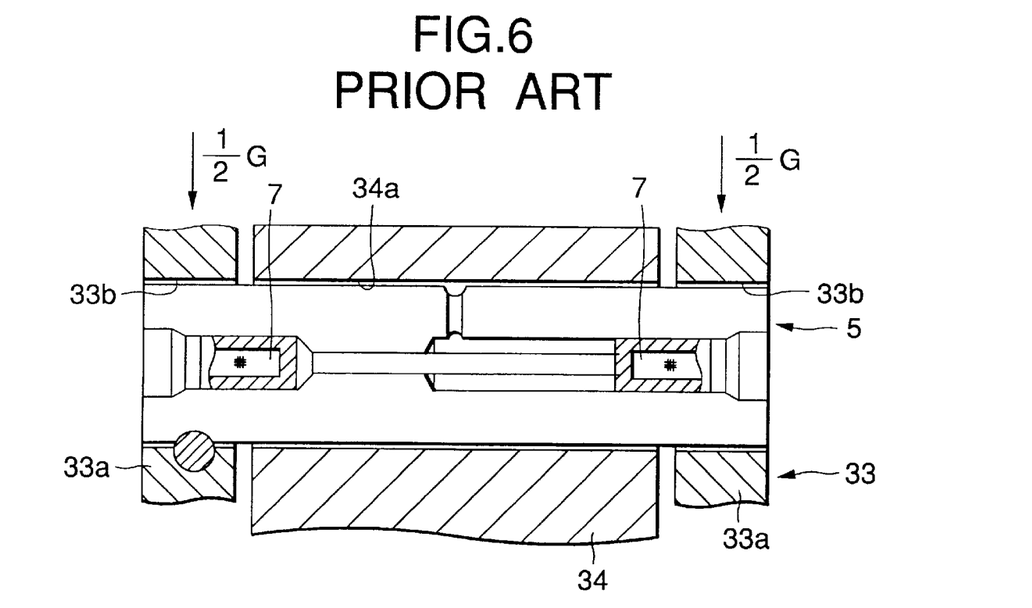
FIG. 6 is an explanatory view showing split vehicle loads equally imposed on the shackle pin and the sensing devices in the inside of the shackle pin in a conventional structure of attachment of vehicle load measurement sensing devices.

As shown in FIG. 6 which is an explanatory view, in this attachment structure, a shackle pin 5 is passed through not only insertion holes 33b of opposite sides 33a of a bracket 33 connected to a carrier frame (not shown) of a vehicle but also an insertion hole 34a of a shackle 34 connected to an end portion of a leaf spring (not shown) and inserted between the opposite sides 33a of the bracket 33. Accordingly, the bracket 33 and the shackle 34 are connected to each other by the shackle pin 5 so as to be rockable.

A sensing device 7 is disposed so as to be received in one end portion of the shackle pin 5 and so as to be laid between one side 33a of the bracket 33 and the bracket 33. Another sensing device 7 is disposed so as to be received in the other end portion of the shackle pin 5 and so as to be laid between the other side 33a of the bracket 33 and the bracket 33. The load of the vehicle imposed on the shackle 34 from the opposite sides 33a of the bracket 33 is measured on the basis of the sum of outputs of the two sensing devices 7, 7.

Figure 7:
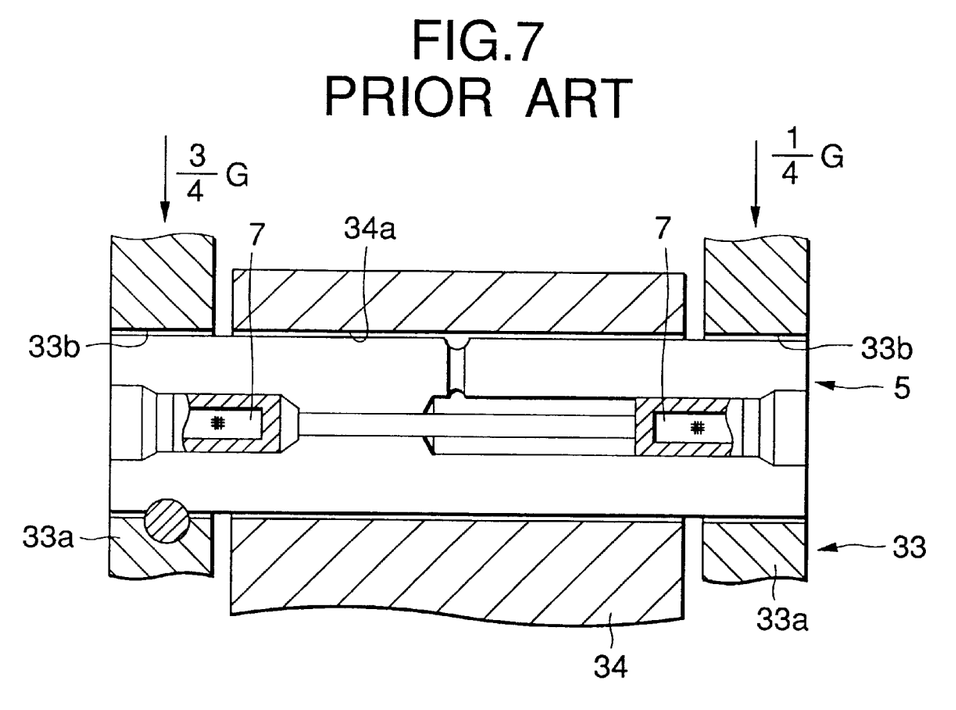
FIG. 7 is an explanatory view showing split vehicle loads unevenly imposed on the shackle pin in FIG. 6 and the sensing devices in the inside of the shackle pin.

Not only in the case where a load of a vehicle is imposed on the shackle pin 5 while the load is allocated to the opposite sides 33a of the bracket 33 so as to be equally divided into halves as shown in FIG. 6, but also in the case where a load of a vehicle is imposed on the shackle pin 5 while the load is allocated to the opposite sides 33a of the bracket 33 so as to be biased to one side, for example, in the condition in which three-fourths of the load of the vehicle is applied to one side 33a of the bracket 33 and one-fourth as the residual part is applied to the other side 33a of the bracket 33 as shown in FIG. 7 which is an explanatory view, the aforementioned structure of attachment of vehicle load measurement sensing devices according to Japanese Patent Unexamined Publication Hei. 8-313332 is excellent in that the load can be measured substantially exactly compared with the case where only one sensing device is received in a shackle pin to measure a load.

However, if there is a difference in characteristic between the two sensing devices 7, 7 received in the shackle pin 5, and if there is a difference between the output signals of the sensing devices 7, 7 even in the case where the same load is imposed, the sum of outputs of the two sensing devices 7, 7 varies correspondingly to the imbalance between split loads imposed on the opposite sides 33a of the bracket 33 in spite of the constant load when the load of the vehicle is unequally allocated to the sides 33a of the bracket 33. Accordingly, the load cannot be measured exactly.

SUMMARY OF THE INVENTION

The present invention is designed upon such circumstances and an object of the present invention is to provide a vehicle load measuring apparatus in which, when a load of a vehicle dispersively allocated to opposite ends of a shaft member of a vehicle is measured on the basis of the sum of outputs of two load measurement sensing devices received in the opposite ends, respectively, of the shaft member, the load can be measured exactly so that there is no variation in measured value caused by the imbalance between split loads even in the case where there is a difference in characteristic between the two sensing devices.

In order to achieve the foregoing object, according to a first aspect of the invention, there is provided a vehicle load measuring apparatus in which a load of a vehicle dispersively imposed on opposite ends of a shaft member of a vehicle is measured on the basis of the sum of load signals outputted from a pair of load measurement sensing devices received in the opposite ends, respectively, of the shaft member and having values corresponding to loads imposed on the sensing devices respectively, characterized in that the vehicle load measuring apparatus comprises a load signal correction resistor which is electrically connected to at least one of the pair of sensing devices to correct the value of the load signal outputted from the one sensing device with respect to a reference load so as to be coincident with the value of the load signal outputted from the other sensing device with respect to the reference load.

According to a second aspect of the invention, in the above-mentioned vehicle load measuring apparatus, the load signal correction resistor is parallelly connected to only one of the pair of sensing devices higher in the value of the load signal outputted therefrom with respect to the reference load; and the resistance value of the load signal correction resistor is set to a value corresponding to the ratio of the reference signals outputted from the pair of sensing devices respectively with respect to the reference load.

In the vehicle load measuring apparatus according to the first aspect of the present invention, the load signal correction resistor corrects a load signal outputted from at least one of sensing devices so that the values of load signals outputted from the sensing devices respectively are equal to each other when reference loads equal to each other are imposed on opposite end portions, respectively, of a shaft member. Accordingly, when loads imposed on the end portions of the shaft member equipped with the sensing members respectively are converted into electric load signals so as to be outputted by the sensing members at the opposite ends of the shaft member, and so long as whole load of the vehicle does not change, the sum of output load signals of the two sensing devices is always kept constant even if there is an imbalance between split loads imposed on the opposite end portions of the shaft member.

Accordingly, even in the case where there is a difference in characteristic between the sensing devices at the opposite ends of the shaft member, the load of the vehicle can be measured always exactly on the basis of the sum of output load signals of the two sensing devices without any influence of the change of the allocation of the load of the vehicle in the direction of extension connecting the opposite ends of the shaft member.

Further, in the vehicle load measuring apparatus according to the second aspect of the present invention, when a split load of the vehicle imposed on one end of the shaft member equipped with one of the pair of sensing devices higher in the value of the output load signal with respect to a reference signal is converted into an electric load signal by the sensing device, the value of the whole output load signal in the load signal correction resistor and the sensing device parallelly connected to the load signal correction resistor is reduced by a current flowing in the load signal correction resistor parallelly connected to the sensing device.

Further, the value of the output load signal of the sensing device higher in the value of the output load signal with respect to the reference load is reduced by a value corresponding to the ratio of output reference signals of the pair of sensing devices with respect to the reference load due to the action of the load signal correction resistor. Accordingly, the load of the vehicle can be measured always exactly by a simple configuration of parallel connection of the load signal correction resistor regardless of the imbalance between split loads imposed on the opposite end portions of the shaft member by the load of the vehicle and regardless of the whole load of the vehicle.

DETAILED DESCRIPTION OF THE INVENTION

Preferred embodiments of a vehicle load measuring apparatus according to the present invention will be described below with reference to the drawings.

Figure 1:
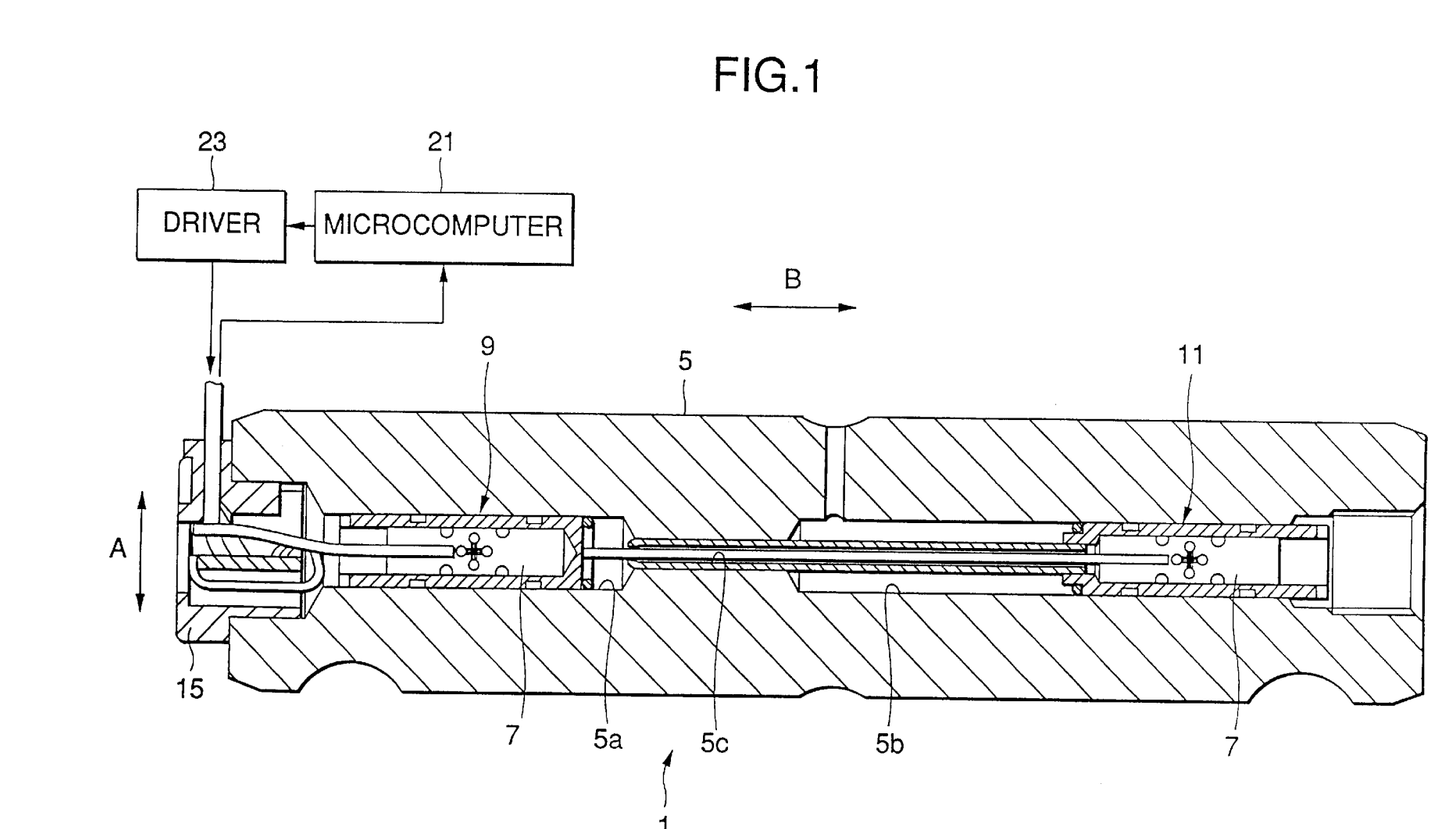
FIG. 1 is a partly block sectional view typically showing the schematic configuration of a vehicle load measuring apparatus according to an embodiment of the present invention.

FIG. 1 is a partly block sectional view typically showing the schematic configuration of a vehicle load measuring apparatus according to an embodiment of the present invention. In the description of FIG. 1, the same members or parts as those in FIGS. 6 and 7 are designated by the same reference characters.

In FIG. 1, a vehicle load measuring apparatus 1 comprises a pair of sensing devices 7, 7 disposed in a shackle pin 5 (equivalent to the shaft member) used for rockably connecting a bracket and a shackle not shown in a vehicle to each other, a correction resistor R for correcting an output difference caused by a difference in characteristic between the sensing devices 7, 7, a micro-computer 21 for measuring a load of the vehicle on the basis of respective output load signals of the sensing devices 7, 7, and a driver 23 for supplying drive electric power to the sensing devices 7, 7 on the basis of an instruction from the micro-computer 21.

The arrangement of the sensing devices 7, 7 in the shackle pin 5 will be described here. Receiving portions 5a and 5b are formed at axial opposite ends, respectively, of the shackle pin 5. In the inside of the shackle pin 5, the two receiving portions 5a and 5b are communicated with each other through a communicating hole 5c.

One sensing device 7 received in a first housing 9 is received together with the first housing 9 in one receiving portion 5a of the shackle pin 5. The other sensing device 7 received in a second housing 11 is received together with the second housing 11 in the other receiving portion 5b of the shackle pin 5.

Figure 2:
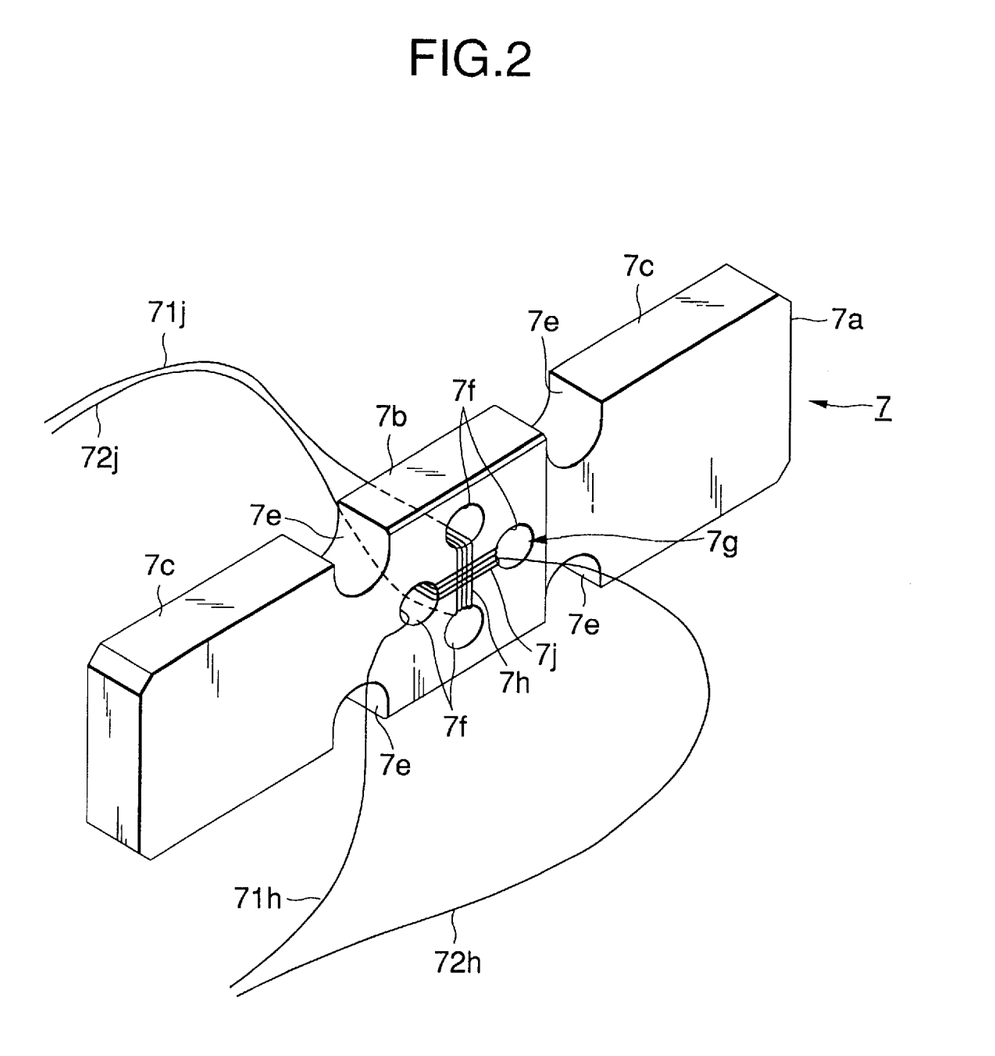
FIG. 2 is a perspective view of a sensing device depicted in FIG. 1.

As shown in FIG. 2 which is a perspective view, the sensing devices 7 received in each of the two receiving portions 5a and 5b of the shackle pin 5 has a plate-like member 7a, and a coil 7g as a sensing portion.

The plate-like member 7a is formed of a magnetic material such as permalloy so as to be substantially shaped like a flat rectangle in plan view. The plate-like member 7a is composed of a coil portion 7b disposed substantially in the lengthwise center, and fixed portions 7c, 7c in opposite sides of the coil portion 7b.

Substantially semicircular notch portions 7e for relaxing stress imposed on the plate-like member 7a are formed in four edge positions in total, that is, in two edge positions in the boundaries between the coil portion 7b and the two fixed portions 7c, 7c on each of the widthwise opposite edges of the plate-like member 7a, "Widthwise" being the direction perpendicular to the lengthwise direction. Four communicating holes 7f are formed to pierce the coil portion 7b, which are formed in the inside of the four notch portions 7e, at intervals both in the lengthwise and widthwise directions.

The coil 7g has an excitation winding 7h and a detection winding 7j which constitute a cross coil. Each of the two windings 7h and 7j is coated with an electrically insulating material (not shown) such as enamel.

Further, the detection winding 7j is wound through two communicating holes 7f, 7f opposite to each other in the lengthwise direction so that opposite ends 71j and 72j of the detection winding 7j are led out from the communicating holes 7f, 7f respectively. The excitation winding 7h is wound through another two communicating holes 7f, 7f opposite to each other in the widthwise direction so that opposite ends 71h and 72h of the excitation winding 7h are led out from the communicating holes 7f, 7f respectively.

The thus configured sensing devices 7 are disposed in the two receiving portions 5a and 5b of the shackle pin 5 as shown in FIG. 1 in the condition that the sensing devices 7 are received in the first housing 9 and the second housing 11 respectively. That is, each of the sensing devices 7 is postured as follows: the lengthwise direction of the plate-like member 7a is arranged along the axial direction of the shackle pin 5 which extends in the direction B of the width of the vehicle; the widthwise direction of the plate-like member 7a is arranged to be the direction A of the height of the vehicle; and the fixed portions 7c on one side are laid over the bracket side while the fixed portions 7c on the other side are laid over the shackle side.

In this state, both the winding axial direction of the detection winding 7j wound through the two communicating holes 7f, 7f opposite to each other in the lengthwise direction of the plate-like member 7a and the winding axial direction of the excitation winding 7h wound through the two communicating holes 7f, 7f opposite to each other in the widthwise direction of the plate-like member 7a are directions along a plane containing the lengthwise and widthwise directions of the plate-like member 7a, that is, directions along a plane along the directions A and B of the height and width of the vehicle.

Figure 3:
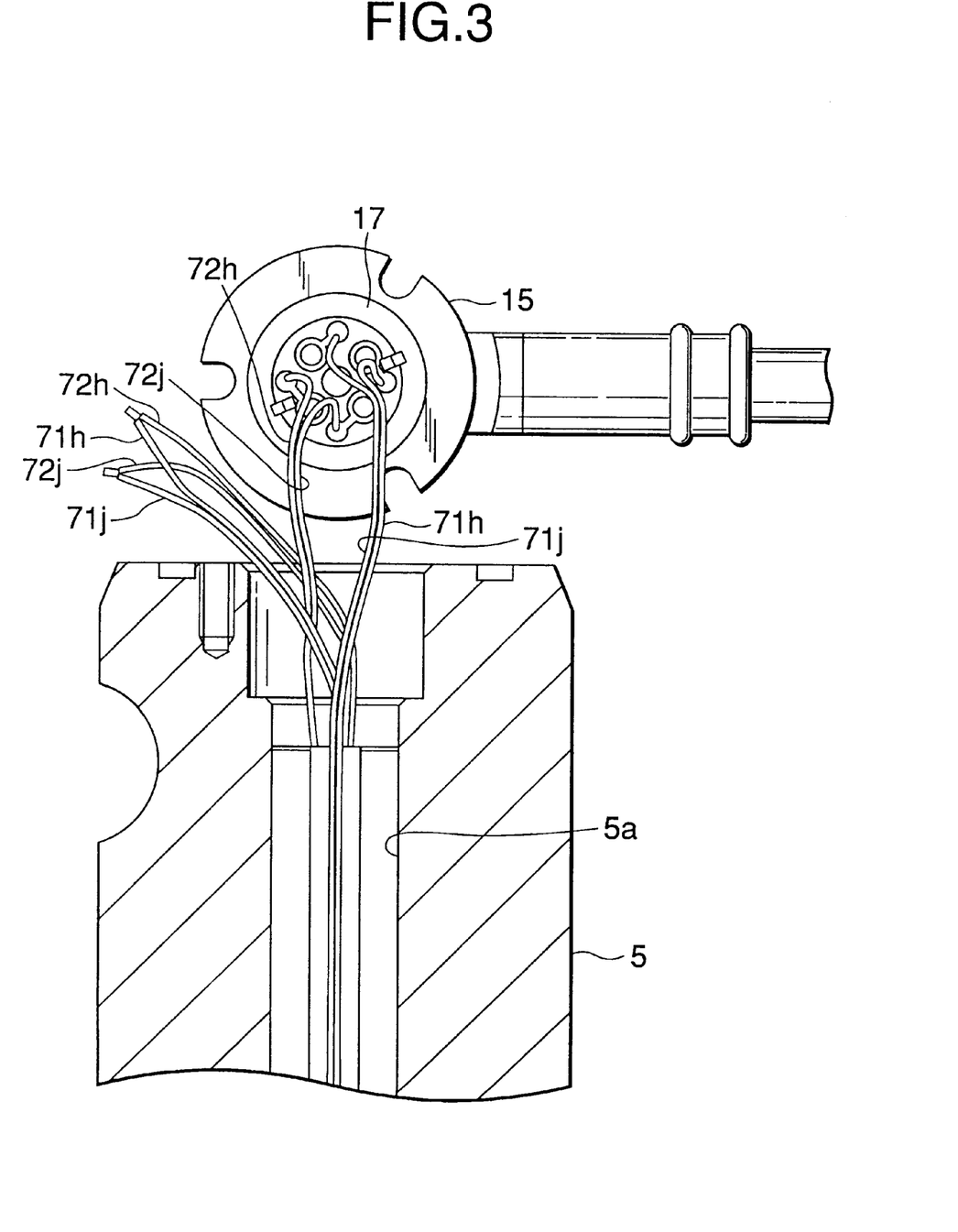
FIG. 3 is an enlarged sectional view of main part in a state in which sensing devices are wired in receiving portions depicted in FIG. 1.

Further, the excitation winding 7h and detection winding 7j of the sensing device 7 disposed in the receiving portion 5b of the shackle pin 5 are led out to the receiving portion 5a side through the communicating hole 5c. As shown in FIG. 3 which is an enlarged sectional view of main part, the respective opposite ends 71h and 72h of the excitation windings 7h are connected to each other and the respective opposite ends 71j and 72j of the detection windings 7j are connected to each other in the inside of a cap 15 fitted to an opening of the receiving portion 5a. Then, the excitation windings 7h and the detection windings 7j are led out of the cap 15 and, as shown in FIG. 1, the excitation windings 7h are connected to the driver 23 and the detection windings 7j are connected to the micro-computer 21.

Figure 4:
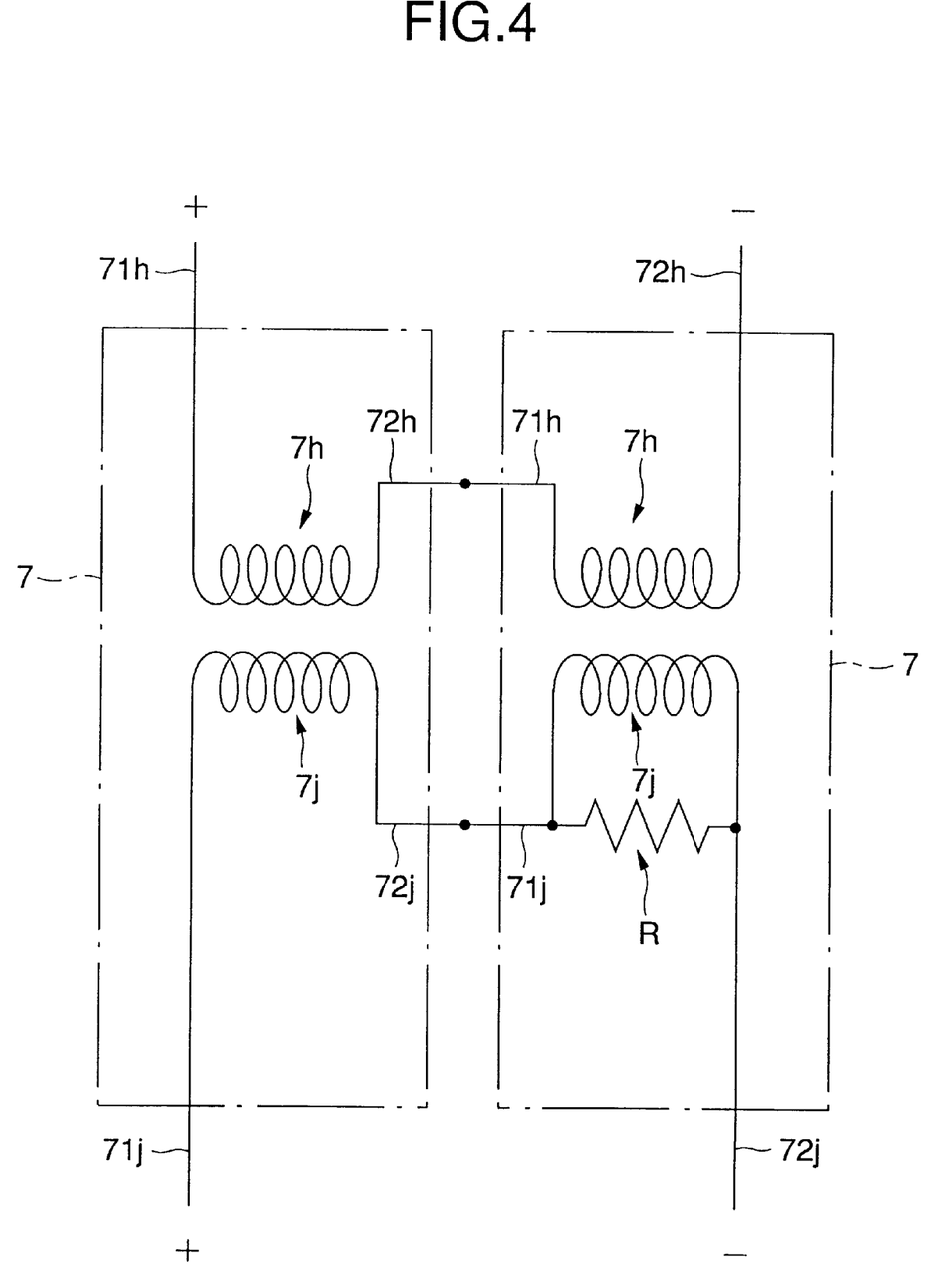
FIG. 4 is a circuit diagram showing a state in which the sensing devices depicted in FIG. 1 are connected to each other.

The aforementioned wiring of the two sensing devices 7, 7 in the cap 15 will be described more in detail with reference to FIG. 4 which is a circuit diagram. One end 71h of the excitation winding 7h of the sensing device 7 in the receiving portion 5a and the other end 72h of the excitation winding 7h of the sensing device 7 in the receiving portion 5b are connected to each other. Similarly, one end 71j of the detection winding 7j of the sensing device 7 in the receiving portion 5a and the other end 72j of the detection winding 7j of the sensing device 7 in the receiving portion 5b are connected to each other.

Further, as shown in FIG. 3, the other end 72h of the excitation winding 7h of the sensing device 7 in the receiving portion 5a and one end 71h of the excitation winding 7h of the sensing device 7 in the receiving portion 5b as the residual parts are connected to lead wires not shown on a substrate 17 received in the cap 15. Then, the lead wires are connected to corresponding plus and minus terminals, respectively, of the driver 23.

Similarly, the other end 72j of the detection winding 7j of the sensing device 7 in the receiving portion 5a and one end 71j of the detection winding 7j of the sensing device 7 in the receiving portion 5b as the residual parts are connected to lead wires not shown on the substrate 17. Then, the lead wires are connected to signal input interface terminals, respectively, of the micro-computer 21.

In the thus connected arrangement, if an electric current is passed between the other end 72h of the excitation winding 7h of the sensing device 7 in the receiving portion 5a and one end 71h of the excitation winding 7h of the sensing device 7 in the receiving portion 5b by drive electric power supplied from the driver 23, electric fields are generated in the plate-like members 7a of the sensing devices 7 due to the currents flowing between the opposite ends 71h and 72h of the excitation windings 7h of the sensing devices 7 respectively so that induced currents flow between the opposite ends 71j and 72j of the detection windings 7j of the sensing devices 7 respectively.

When, in this state, the load of the vehicle is imposed on the plate-like members 7a of the sensing devices 7, 7 in the receiving portions 5a and 5b through the opposite sides of the shackle from the bracket and through the opposite ends of the shackle pin 5, the bracket moves in the direction A of the height of the vehicle relative to the shackle so that the plate-like members 7a of the sensing devices 7, 7 are distorted along the direction A of the height of the vehicle. Accordingly, the directions of magnetic field in the plate-like members 7a change so that the induced currents flowing between the opposite ends of the detection windings 7j change.

Accordingly, currents Ia and Ib having values corresponding to split loads imposed on the plate-like members 7a of the sensing members 7, 7 in the receiving portions 5a and 5b respectively flow between the opposite ends 71j and 72j of the detection windings 7j of the sensing devices 7, 7 respectively through the end portions of the shackle pin 5. Accordingly, load signals having voltages Va and Vb obtained by multiplying the currents Ia and Ib by the resistance values "r" of the detection windings 7j of the sensing devices 7, which values "v" are equal to each other between the receiving portions 5a and 5b, are generated between the opposite ends 71j and 72j of the detection windings 7j of the sensing devices 7, 7 in the receiving portions 5a and 5b respectively.

Further, in the case where the load of the vehicle is equally allocated to the opposite end portions of the shackle pin 5, the voltages Va and Vb of the load signals of the sensing devices 7, 7 ought to be equal to each other ideally.

This is because, if split loads imposed on the sensing devices 7 in the receiving portions 5a and 5b respectively are equal to each other, the degree of distortion, in the direction A of the height of the vehicle, generated in the plate-like member 7a of the sensing device 7 in the receiving portion 5a becomes equal to the degree of distortion, in the direction A of the height of the vehicle, generated in the plate-like member 7a of the sensing device 7 in the receiving portion 5b, that is, the current Ia flowing between the opposite ends 71j and 72j of the detection winding 7j of the sensing device 7 in the receiving portion 5a becomes equal to the current Ib flowing between the opposite ends 71j and 72j of the detection winding 7j of the sensing device 7 in the receiving portion 5b, the resistance values "r" of both the detection windings 7j in the receiving portions 5a and 5b being equal to each other.

In practice, however, the values of the currents Ia and Ib flowing between the opposite ends 71j and 72j of the detection windings 7j of the sensing devices 7 in the receiving portions 5a and 5b respectively become different from each other because of the difference in characteristic between the sensing devices 7, 7, even if the degree of distortion, in the direction A of the height of the vehicle, generated in the plate-like members 7a of the sensing devices 7, 7 are equal to each other. Consequently, the values of the voltages Va and Vb of the load signals of the sensing devices 7, 7 become different from each other.

Figure 5:
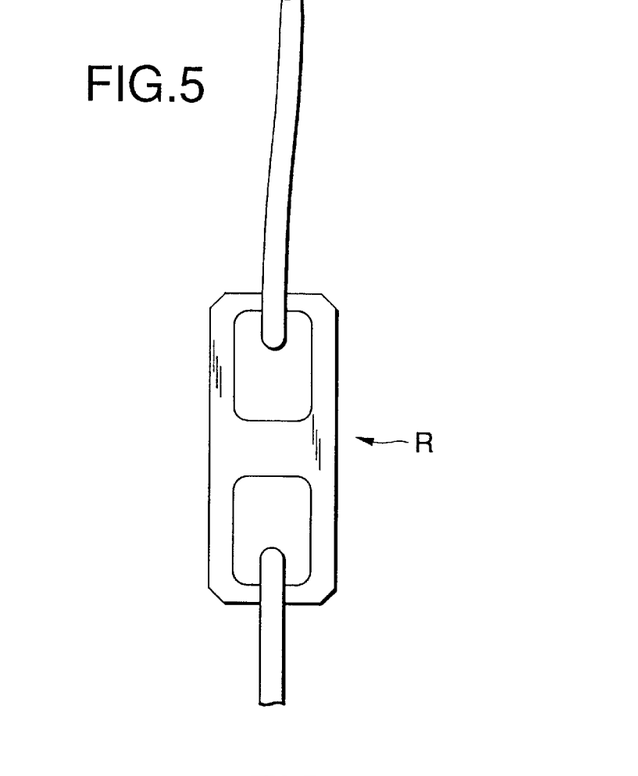
FIG. 5 is an enlarged plan view of the correction resistor depicted in FIG. 4.

Therefore, as shown in an enlarged plan view of FIG. 5, the vehicle load measuring apparatus 1 in this embodiment is designed so that the correction resistor R shaped like a chip is connected to the sensing device 7 having higher one of voltages Va and Vb of the load signals generated between the opposite ends 71j and 72j of the detection windings 7j in order to make the voltage of the load signal coincident with the lower one when equal split loads are applied.

That is, in the case of this embodiment, the voltage Va of the load signal generated between the opposite ends 71j and 72j of the detection winding 7j of the sensing device 7 in the receiving portion 5a is larger than the voltage Vb of the load signal generated between the opposite ends 71j and 72j of the detection winding 7j of the sensing device 7 in the receiving portion 5b when equal split loads are applied. As shown in FIG. 4, therefore, the correction resistor R is parallelly connected between the opposite ends 71j and 72j of the detection winding 7j of the sensing device 7 in the receiving portion 5a.

The operation (action) of the vehicle load measuring apparatus 1 configured as described above in this embodiment will be described below.

When an excitation current is passed between the other end 72h of the excitation winding 7h of the sensing device 7 in the receiving portion 5a of the shackle pin 5 and one end 71h of the excitation winding 7h of the sensing device 7 in the receiving portion 5b through the minus and plus terminals of the driver 23 by electric power supplied from the microcomputer 21 in order to measure vehicle load imposed on the shackle pin 5, a part of the induced current flowing in the detection winding 7j of the sensing device 7 in the receiving portion 5a side flows also in the correction resistor R.

Hence, the voltage V of the load signal generated in the receiving portion 5a side is reduced by a voltage drop caused by the current flowing in the correction resistor R. Accordingly, if the split vehicle loads imposed on the receiving portions 5a and 5b, respectively, of the shackle pin 5 are equal to each other, the voltage V of the load signal generated in the receiving portion 5a side becomes equal to the voltage Vb of the load signal generated in the receiving portion 5b side.

When, for example, the case where three-fourths of the load of the vehicle is imposed on the receiving portion 5a side and one-fourth of the load of the vehicle is imposed on the receiving portion 5b side is compared with the case where one-fourth of the load of the vehicle is contrariwise imposed on the receiving portion 5a side and three-fourths of the load of the vehicle is imposed on the receiving portion 5b side, the directions of imbalance are reversed but the degrees of imbalance are equal to each other. Furthermore, when the load is equally allocated to the receiving portions 5a and 5b, the voltage V of the load signal generated in the receiving portion 5a side becomes equal to the voltage Vb of the load signal generated in the receiving portion 5b side. Accordingly, the following fact is established.

That is, the voltage V of the load signal generated in the receiving portion 5a side in the case where three-fourths of the load of the vehicle is imposed on the receiving portion 5a side becomes equal to the voltage Vb of the load signal generated in the receiving portion 5b side in the case where three-fourths of the load of the vehicle is imposed on the receiving portion 5b side. Similarly, the voltage Vb of the load signal generated in the receiving portion 5b side in the case where three-fourths of the load of the vehicle is imposed on the receiving portion 5a side becomes equal to the voltage V of the load signal generated in the receiving portion 5a side in the case where three-fourths of the load of the vehicle is imposed on the receiving portion 5b side.

Incidentally, the resistance value of the correction resistor R can be determined as follows.

That is, in the case of the current Ia' flowing between the opposite ends 71j and 72j of the detection winding 7j of the sensing device 7 in the receiving portion 5a, the current Ir (Ia'>>Ir) flowing in the correction resistor R and k=Vb/Va (in which k is a constant), the equation Ib=Ia k holds because the equation Vb/Va=Ib/Ia holds originally. Accordingly, the current Ia' is made equal in value to the current Ib because of the parallel connection of the correction resistor R, so that the equation Ia'=Ia k ought to hold.

Further, because of Ia'+Ir=Ia and Ir=Ia−Ia', the equation Ir=Ia−(Ia k)=(1−k) Ia is given from Ia'=Ia k. If the equal resistance values of the detection windings 7j of the sensing devices 7 in the receiving portion 5a side and in the receiving portion 5b side are r, the resistance value Rr of the correction resistor R is given by the equation Rr=Vb/Ir=Vb/{(1−k)Ia}. Assuming Ia'≈Ia=Ib from Ia'>>Ir and Ia'+Ir=Ia, the expression Rr=Vb/{(1−k)Ia}≈Vb/{(1−k)Ib} holds.

Accordingly, from Vb/Ib=r, the expression Rr≈r/(1−k) holds.

As described above, in the vehicle load measuring apparatus in this mode, the correction resistor R is parallelly connected to the detection winding 7j of the sensing device 7 in the receiving portion 5a side, when there is a difference in characteristic between the sensing devices 7, 7 received respectively in the receiving portions 5a and 5b disposed at the opposite ends of the shackle pin 5 so that the voltage Va of the load signal obtained from the sensing device 7 in the receiving portion 5a side is higher than the voltage Vb of the load signal obtained from the sensing device 7 in the receiving portion 5b side even if the split loads imposed on the respective receiving portions 5a and 5b are equal to each other.

Accordingly, a part of the induced current flowing between the opposite ends 71j and 72j of the detection winding 7j flow also in the correction resistor R so that a voltage drop occurs in the correction resistor R. By this voltage drop, the voltage V of the load signal obtained from the sensing device 7 in the receiving portion 5a side is made coincident with the voltage Vb of the load signal obtained from the sensing device 7 in the receiving portion 5b side.

Accordingly, even in the case where split loads of the vehicle are unevenly imposed on the opposite ends of the shackle pin 5 when there is a difference in characteristic between the sensing devices 7, 7 in the two receiving portions 5a and 5b, load can be always measured exactly on the basis of the output load signals of the sensing devices 7, 7 in the two receiving portions 5a and 5b by a simple configuration of parallel connection of the correction resistor R regardless of the fact that the load leans to either one of the opposite end portions.

Although this embodiment has shown the case where the correction resistor R having a resistance value Rr corresponding to the ratio of the larger and smaller values of the load signals is parallelly connected to the detection winding 7j of the sensing device 7 in which the load signal of the larger value is generated with respect to the same load, configuration may be made so that the correction resistor R is connected to the detection winding 7j of the sensing device 7 smaller in the value of the load signal.

However, if the correction resistor R of the resistance value Rr is parallelly connected to the detection winding 7j of the sensing device in which the load signal of the larger value is generated as shown in this embodiment, the value of the load signal to be reduced by the action of the correction resistor R becomes a value corresponding to the ratio of the larger and smaller values of the load signals. Accordingly, the load of the vehicle can be measured exactly by a simple configuration of parallel connection of the correction resistor R to the detection winding 7j of the sensing device 7 regardless of the degree of imbalance between the split vehicle loads imposed on the opposite ends of the shackle pin 5, regardless of the fact to which one of the opposite ends the load lean, and regardless of the value of the load of the vehicle. This is advantageous.

Although this mode has been exemplified about the case where sensing devices 7 are disposed at the opposite ends of the shackle pin 5, it is a matter of course that the present invention can be also widely applied to the case where the load of the vehicle is measured on the basis of the sum of output load signals of load measurement sensing devices attached to the opposite ends, to which the load of the vehicle is dispersively allocated, of any vehicle shaft members such as a trunnion shaft.

As described above, according to the first aspect of the invention, the vehicle load measuring apparatus in which a load of a vehicle dispersively imposed on opposite ends of a shaft member of a vehicle is measured on the basis of the sum of load signals outputted from a pair of load measurement sensing devices received in the opposite ends, respectively, of the shaft member and having values corresponding to loads imposed on the sensing devices respectively, is configured such that the vehicle load measuring apparatus comprises a load signal correction resistor which is electrically connected to at least one of the pair of sensing devices to correct the value of the load signal outputted from the one sensing device with respect to a reference load so as to be coincident with the value of the load signal outputted from the other sensing device with respect to the reference load.

Accordingly, the load signal correction resistor corrects a load signal outputted from at least one of sensing devices so that the values of load signals outputted from the sensing devices respectively are equal to each other when reference loads equal to each other are imposed on opposite end portions, respectively, of a shaft member. Accordingly, when loads imposed on the end portions of the shaft member equipped with the sensing members respectively are converted into electric load signals so as to be outputted by the sensing members at the opposite ends of the shaft member, and so long as whole load of the vehicle does not change, the sum of output load signals of the two sensing devices is always kept constant even if there is an imbalance between split loads imposed on the opposite end portions of the shaft member.

Accordingly, even in the case where there is a difference in characteristic between the sensing devices at the opposite ends of the shaft member, the load of the vehicle can be measured always exactly on the basis of the sum of output load signals of the two sensing devices without any influence of the change of the allocation of the load of the vehicle in the direction of extension connecting the opposite ends of the shaft member.

According to the second aspect of the invention, in the above-mentioned vehicle load measuring apparatus, the load signal correction resistor is parallelly connected to only one of the pair of sensing devices higher in the value of the load signal outputted therefrom with respect to the reference load; and the resistance value of the load signal correction resistor is set to a value corresponding to the ratio of the reference signals outputted from the pair of sensing devices respectively with respect to the reference load.

Accordingly, when a split load of the vehicle imposed on one end of the shaft member equipped with one of the pair of sensing devices higher in the value of the output load signal with respect to a reference signal is converted into an electric load signal by the sensing device, the value of the whole output load signal in the load signal correction resistor and the sensing device parallelly connected to the load signal correction resistor is reduced by a current flowing in the load signal correction resistor parallelly connected to the sensing device.

Further, the value of the output load signal of the sensing device higher in the value of the output load signal with respect to the reference load is reduced by a value corresponding to the ratio of output reference signals of the pair of sensing devices with respect to the reference load due to the action of the load signal correction resistor. Accordingly, the load of the vehicle can be measured always exactly by a simple configuration of parallel connection of the load signal correction resistor regardless of the imbalance between split loads imposed on the opposite end portions of the shaft member by the load of the vehicle and regardless of the whole load of the vehicle.

What is claimed is:

1. A vehicle load measuring apparatus, comprising:
   a pair of load measurement sensing devices received in opposite ends, respectively, of a shaft member of a vehicle, a load of the vehicle dispersively imposed on the opposite ends of the shaft member of the vehicle being measured on the basis of the sum of load signals outputted from the pair of load measurement sensing devices and having values corresponding to loads imposed on the sensing devices respectively; and
   a load signal correction resistor electrically connected to at least one of the pair of sensing devices to correct a value of the load signal outputted from the one sensing device with respect to a reference load so as to be coincident with a value of the load signal outputted from the other sensing device with respect to the reference load.

2. A vehicle load measuring apparatus according to claim 1, wherein the load signal correction resistor is parallelly connected to only one of the pair of sensing devices higher in the value of the load signal outputted therefrom with respect to the reference load; and a resistance value of the load signal correction resistor is set to a value corresponding to the ratio of the load signals outputted from the pair of sensing devices respectively with respect to the reference load.

3. A vehicle load measuring apparatus as claimed in claim 1, further comprising means for accurately measuring a vehicle load even when said vehicle load is unequally applied to said load measurement sensing devices.

4. A vehicle load measuring apparatus, comprising:
   two load measurement sensing devices, each of which is disposed at one end of a shaft member of a vehicle, wherein each load measurement sensing device measures at least a portion of a vehicle load so that the weight of said vehicle load is determined from a sum of load signals outputted from said load measurement sensing devices; and
   a load signal correction resistor electrically connected to one of the load measurement sensing devices.

5. A vehicle load measuring apparatus as claimed in claim 4, wherein said load signal correction resistor is connected in parallel to one of the pair of load measurement sensing devices.

6. A vehicle load measuring apparatus as claimed in claim 4, wherein each of said load measurement sensing devices comprises:
   a magnetic member containing four communicating holes;
   an excitation winding wound through two of said four communicating holes;
   a detection winding wound through the other two of said four communicating holes and perpendicular to said excitation winding.

7. A vehicle load measuring apparatus as claimed in claim 6, wherein said load signal correction resistor is connected in parallel to said detection winding.

8. A vehicle load measuring apparatus, comprising:
- a pair of load measurement sensing devices respectively received in opposite ends of a shaft member of a vehicle, wherein each of said load measurement sensing devices further comprises
- an excitation winding supplied with a first current;
- a detection winding in which a second current is induced by said first current;
- a magnetic member with a magnetic field which is excited by said first current, wherein said magnetic member changes in shape in response to a vehicle load placed thereon, so that said magnetic field changes in direction;
- a processor which measures a sum of load signals output by said load measurement sensing devices corresponding to a change in said second current caused by the change in direction of said magnetic field, and computes the weight of said vehicle load therefrom, and
- a load signal correction resistor electrically connected to at least one of the load measurement sensing devices so that said load measurement sensing devices are calibrated to detect equal reference weights when such weights are placed on each.

9. A vehicle load measuring apparatus as claimed in claim 8, wherein said load signal correction resistor is connected in parallel to the detection winding of the load measurement sensing device having a higher load signal, and wherein a value of said load signal correction resistor corresponds to the ratio of the load signals output by said load measurement sensing devices when said equal references weights are placed on each.

10. A vehicle load measuring apparatus as claimed in claim 8, wherein said vehicle load is measured accurately even when said vehicle load is dispersively or unequally applied to said load measurement sensing devices.

11. A vehicle load measuring apparatus as claimed in claim 6, wherein the magnetic member is a plate.

* * * * *